United States Patent [19]

McClanahan et al.

[11] Patent Number: 4,980,810

[45] Date of Patent: Dec. 25, 1990

[54] VHF DC-DC POWER SUPPLY OPERATING AT FREQUENCIES GREATER THAN 50 MHZ

[75] Inventors: Robert F. McClanahan, Valencia; Robert D. Washburn, Malibu; Carlos H. Gonzalez, La Mirada; James A. Anderson, deceased, late of Gardena; by Roger K. Anderson, administrator, Sepulveda; George Biner, Los Angeles; David M. Lusher, Torrance; William J. Council, Newbury Park; Earl H. Martin, Moorpark, all of Calif.

[73] Assignee: Hughes Aircraft Company, Los Angeles, Calif.

[21] Appl. No.: 357,400

[22] Filed: May 25, 1989

[51] Int. Cl.$^5$ ............................................. H02M 3/335
[52] U.S. Cl. ........................................ 363/16; 363/21; 363/131
[58] Field of Search ..................... 363/16, 20, 131, 147

[56] References Cited

U.S. PATENT DOCUMENTS

| 4,024,452 | 5/1977 | Seidel | 363/16 |
| 4,449,174 | 5/1984 | Ziesse | 363/21 |
| 4,730,241 | 3/1988 | Takava | 363/147 |
| 4,845,605 | 7/1989 | Steigerwald | 363/21 |

Primary Examiner—William H. Beha, Jr.
Attorney, Agent, or Firm—Leonard A. Alkov; Wanda K. Denson-Low

[57] ABSTRACT

A DC to DC power supply including an RF driver circuit for providing an RF output drive signal having a frequency greater than about 50 MHz, power amplifier circuitry responsive to the RF output drive signal and a DC voltage supply for providing an amplified AC output, and an impedance transforming circuit such as a balun transformer for transforming the AC amplified output to an impedance transformed AC signal. The transformed AC signal is provided to a rectifying circuit which provides a DC output. A feedback regulation control circuit provides for regulation of the power supply output voltage. The DC to DC power supply is advantageously implemented with printed microstrip or stripline passive components.

21 Claims, 6 Drawing Sheets

VHF DC-DC POWER SUPPLY OPERATING AT FREQUENCIES GREATER THAN 50 MHZ

BACKGROUND OF THE INVENTION

The disclosed invention is generally directed to DC to DC power supplies, and is more particularly directed to a DC to DC power supply which operates at very high frequencies with high DC voltage sources.

DC to DC power supplies are utilized in applications where the originating power source provides a DC voltage and the required voltage is a DC voltage different from that provided by the originating power source. Typically, the originating DC power is converted to AC power, for example, in square wave or sinewave form, which is appropriately stepped up or stepped down with a transformer. The transformed AC power is appropriately rectified and filtered to provide the desired DC power.

It is recognized in the art that higher AC operating frequencies provide reduced size and weight of power supplies, thereby increasing power density (i.e., the amount of power output per unit volume of circuitry). However, considerations such as transformer size, reduced transformer coupling, and switching losses have prevented the utilization of very high frequencies, for example, 20 MHz and greater, with existing DC to DC power supply designs.

A further consideration with existing DC to DC power supply designs is the inability to convert high DC voltages at very high frequencies due to device operating limitations.

SUMMARY OF THE INVENTION

It would therefore be an advantage to provide a DC to DC power supply that operates at very high frequencies.

Another advantage would be to provide a DC to DC power supply that operates with high DC source voltages at very high frequencies.

The foregoing and other advantages are provided by the invention in a DC to DC power supply that includes an RF driver circuit for providing an RF output drive signal having a frequency greater than about 50 MHz, power amplifier circuitry responsive to the RF output drive signal and a DC voltage supply for providing an amplified AC output, and an impedance transforming circuit such as a balun transformer for transforming the AC amplified output to an impedance transformed AC signal. The transformed AC signal is provided to a rectifying circuit which provides a DC output. The DC to DC power supply is advantageously implemented with printed microstrip or stripline passive components.

The invention further includes a feedback regulation control circuit which provides for regulation of the power supply output voltage.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

In the following detailed description and in the several figures of the drawing, like elements are identified with like reference numerals.

Figure 1:
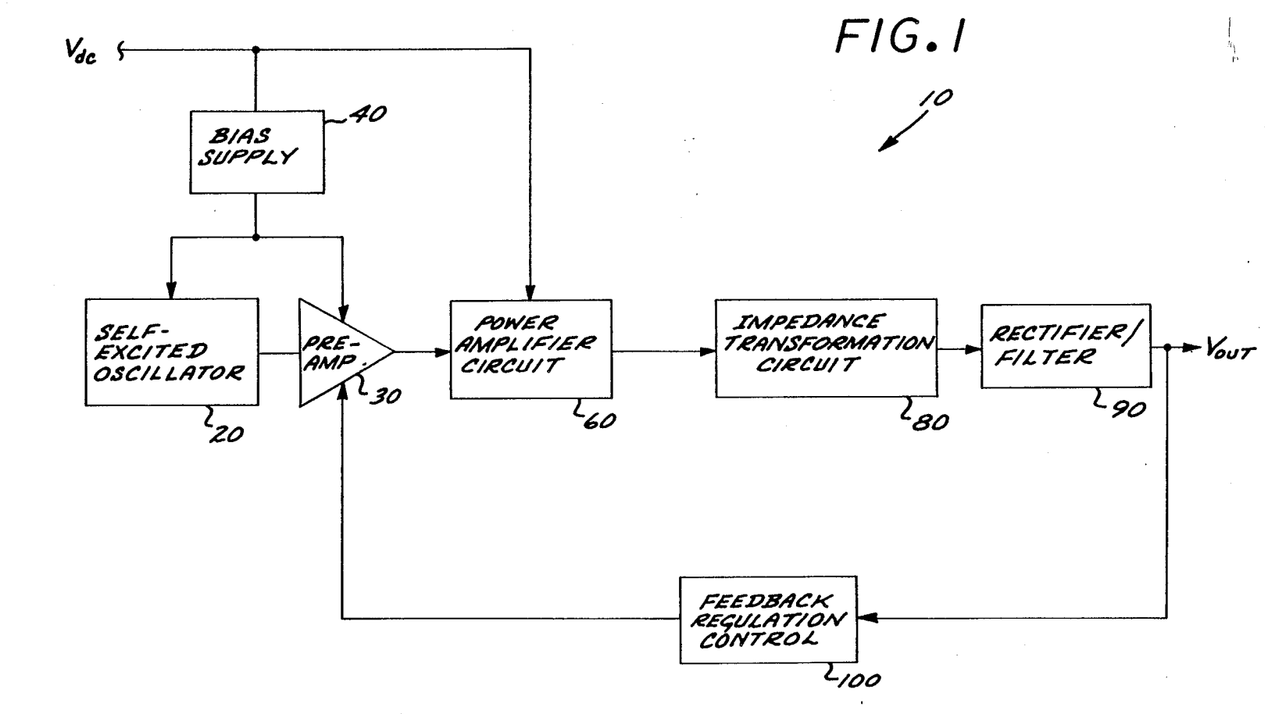
FIG. 1 is a block diagram of a power supply in accordance with the invention.

Referring now to FIG. 1, illustrated therein is a block diagram of a DC to DC power supply 10 which includes a self-excited oscillator 20 that provides its AC output to a preamplifier 30. A bias supply circuit 40 coupled to a DC power source $V_{dc}$ provides DC bias for the oscillator 20 and the preamplifier 30.

The power supply 10 further includes an AC power amplifier circuit 60 that provides its AC power output to an impedance transformation circuit 80. The impedance transformation circuit 80 steps the voltage up or down as required to provide a transformed AC power output to a rectifier/filter circuit 90 which rectifies and filters the AC power to provide the desired DC output voltage $V_{out}$. As discussed more fully herein, the AC power amplifier circuit 60 includes one or more power amplifiers and provides one or more AC outputs. The output voltage $V_{out}$ is regulated tightly over varying load conditions via a feedback regulation control circuit 100 which senses the output voltage $V_{out}$ and provides a control signal to the preamplifier 30 to control the DC current therethrough, thereby controlling the RF output drive signal provided by the preamplifier 30 to the power amplifier circuit 60.

Figure 2:
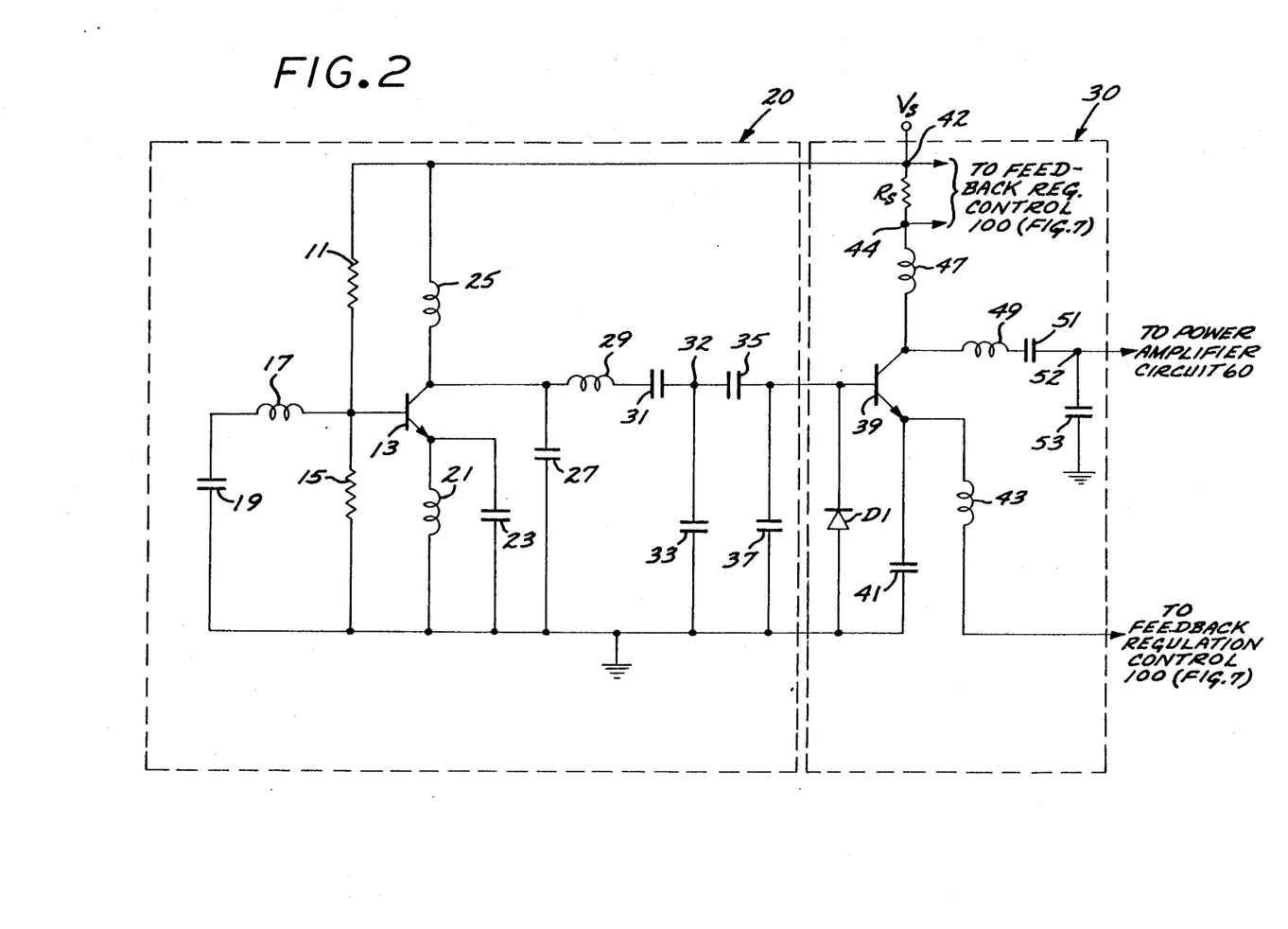
FIG. 2 is an illustrative example of an oscillator and a preamplifier which can be utilized in the power supply of FIG. 1.

Referring now to FIG. 2, the self-excited oscillator 20 includes a resistor 11 connected between the power source $V_{dc}$ and the base of an NPN transistor 13 which is configured as a tuned base oscillator. An inductor 17 and a capacitor 19 are serially connected between the base of the transistor 13 and a common reference potential which can be ground, and comprise a series resonant circuit which determines the operating frequency of the oscillator 20.

A resistor 15 is connected between the base of the transistor 13 and the common reference potential. An inductor 21 and a capacitor 23 are connected in parallel between the emitter of the transistor 13 and ground. The collector of the transistor 13 is coupled to the bias voltage $V_s$ provided by the bias supply 40 via an RF choke 25. The resistors 11, 15 and the inductors 21, 25 provide the bias for the transistor 13, while the capacitor 23 provides feedback for oscillation.

A capacitor 27 is connected between the collector of the transistor 13 and ground, and an inductor 29 is serially connected with a capacitor 31 between the collector of the transistor 13 and a node 32. A capacitor 33 is connected between the node 32 and ground, while a capacitor 35 is connected between the node 32 and the base of an NPN transistor 39 of the preamplifier 30. A capacitor 37 is connected between the base of the transistor 39 and ground. The inductor 29 and the capacitors 27, 31, 33, 35, 37 match the power from the oscillator into the preamplifier 30.

The preamplifier 30 includes the NPN transistor 39 and a base biasing diode D1 is connected between the base of the transistor 39 and the common reference potential. A capacitor 41 is connected between the emitter of the transistor 39 and ground, and an inductor 43 is connected between the emitter of the transistor 39 and the feedback regulation control circuit 100 which controls the DC current through the preamplifier 30.

The collector of the transistor 39 is coupled to bias voltage $V_s$ via an RF choke 47 and a sensing resistor $R_s$ which senses the DC collector current of the transistor 39. The terminals of the sampling resistor $R_s$ are further connected to the feedback regulation control circuit 100 which is responsive to the voltage across the sensing resistor $R_s$, which voltage is representative of the DC collector current of the transistor 39.

An inductor 49 and a capacitor 51 are serially connected between the collector of the transistor 39 and a node 52 which is connected to the power amplifier circuit 60. A capacitor 53 is connected between the node 52 and ground. The inductor 49 and the capacitors 51, 53 comprise a tuned output matching network that is tuned to the operating frequency of the oscillator 20.

While an oscillator and preamplifier have been disclosed for providing the RF output drive signal to the power amplifier circuit 60, it should be appreciated that a power oscillator could also be utilized to provide the RF drive output signal. The power oscillator would include a transistor configured similarly to the transistor 39 as well as a sensing resistor, and would be responsive to the feedback regulation circuit 100 for the control of the RF output drive signal.

Figure 3:
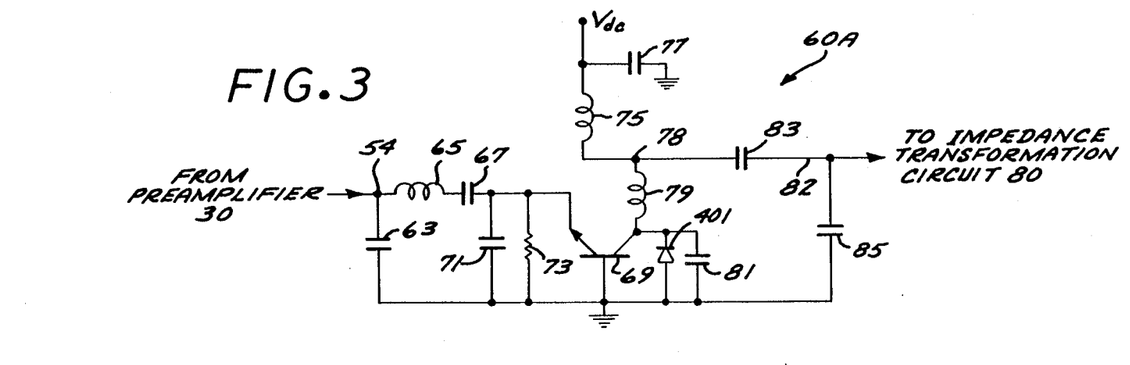
FIG. 3 is an illustrative example of a power amplifier circuit which can be utilized in the power supply of FIG. 1.

Referring now to FIG. 3, shown therein is a schematic of a single stage power amplifier 60A which can be utilized as the AC power amplifier circuit 60. It should be noted that with a single stage power amplifier, and depending on the voltage of the DC power source $V_{dc}$, the bias supply 40 might not be necessary, in which case the biasing for the self-excited oscillator and the preamplifier could be provided directly by the power source $V_{dc}$.

The power amplifier 60A includes a capacitor 63 which is connected between an input node 54 connected to the node 52 of the preamplifier 30 (FIG. 2) and the base of an NPN transistor 69. An inductor 65 and a capacitor 67 are connected in series between the node 54 and the emitter of the transistor 69. A capacitor 71 and a resistor 73 are connected in parallel between the emitter of the transistor 69 and the base thereof. The base of the transistor 69 is connected to a common reference potential such as ground.

An RF choke 75 and an inductor 79 are serially connected between the collector of the transistor 69 and the power source $V_{dc}$. A capacitor 77 is connected between the power source $V_{dc}$ and ground. A capacitor 81 and a diode 401 are connected in parallel between the collector of the transistor 69 and the base thereof. A capacitor 83 is connected between a node 78 and an output node 82, and a capacitor 85 is connected between the output node 82 and the base of the transistor 69b.

The power amplifier 60A operates as follows. The transistor 69 functions as a switch and is always in one of the following three states, depending on the current applied to its base. It is ON when it is conductive with the associated relatively low collector-emitter resistance. It is OFF when it is non-conductive with a relatively high collector-emitter resistance. It is IN TRANSITION when it transitions from the ON state to the OFF state, as well as from the OFF state to the ON state.

The input to the power amplifier at the input node 54 is a sinusoidal voltage. The network comprising the capacitors 63, 67, 71 and the inductor 65 is a tuned input matching network that is tuned to the frequency of the oscillator 20 and matches the source impedance of the preamplifier 30 to the base-emitter impedance of the transistor 69.

The RF choke 75 has a sufficiently high reactance so that the current flow therethrough is substantially constant for any given load. The inductor 79 and the capacitors 83, 85 form a tuned output matching network that is tuned to the frequency of the oscillator 20 and matches the transistor collector impedance to the load impedance of the impedance transformation circuit 80. The Q of the tuned output matching network is sufficient to allow the current circulating around the network comprising the inductor 79 and the capacitors 81, 83, 85 to be sinusoidal.

When the transistor 69 is OFF, the collector voltage is produced by charging of the capacitor 81, and the collector-base and collector-emitter capacitances of the transistor 69. The current that charges these capacitances is the sum of the DC current through the RF choke 75 and the current in the tuned circuit comprising the inductor 79 and the capacitor 83. The collector voltage approximates a classical half-wave sinewave signal. Since the tuned output matching network comprising the inductor 79 and the capacitors 83, 85 forces a sinusoidal current output, the voltage at the output node 82 is a classical sinewave at the fundamental frequency defined by the oscillator. However, there is a shift in phase between the signal at the collector of the transistor 69 and the signal at the output node 82 due to the tuned matching network.

When the transistor 69 turns on, the collector voltage is prevented from going negative by the diode 401. In particular, the diode 401 prevents reverse conduction of current through the collector-emitter junction of the transistor 69, and also prevents the base-collector junction from becoming forward biased, thereby substantially eliminating storage time problems in the transistor.

Figure 4:
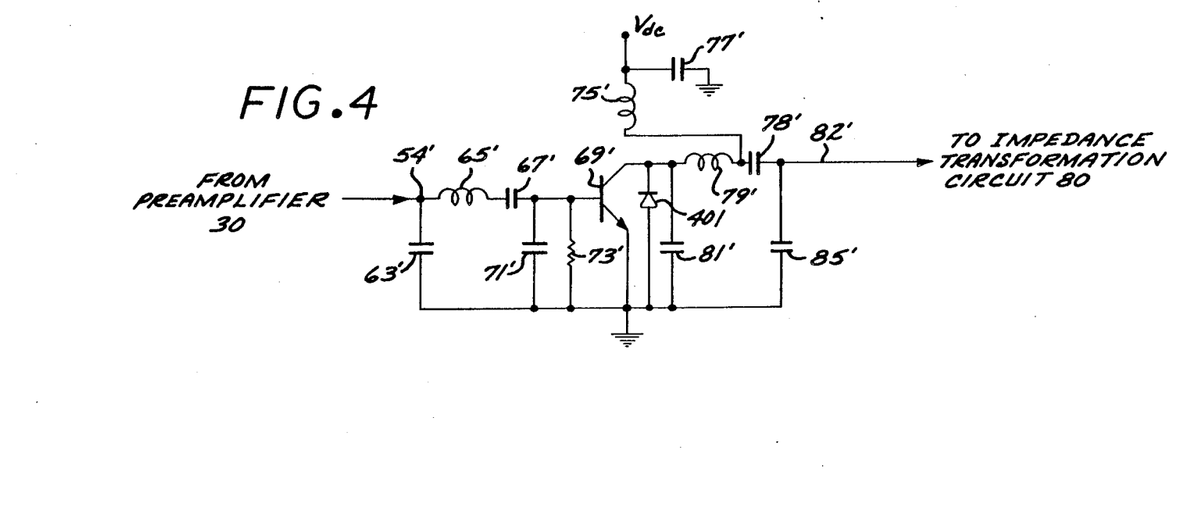
FIG. 4 is another illustrative example of a power amplifier circuit which can be utilized in the power supply of FIG. 1.

While the foregoing illustrative example of a single stage power amplifier 60A is a common base amplifier, a common emitter amplifier as schematically illustrated in FIG. 4 could also be utilized for the amplifier circuit 60 in FIG. 1. The common emitter amplifier of FIG. 4 is topologically similar to the common base amplifier of FIG. 3, with the difference being connections of the base and emitter of the transistor 69'. The values of the elements of the tuned circuits of the power amplifier of FIG. 4 will be different, to some extent, from the values of the corresponding elements in FIG. 3.

Figure 5:
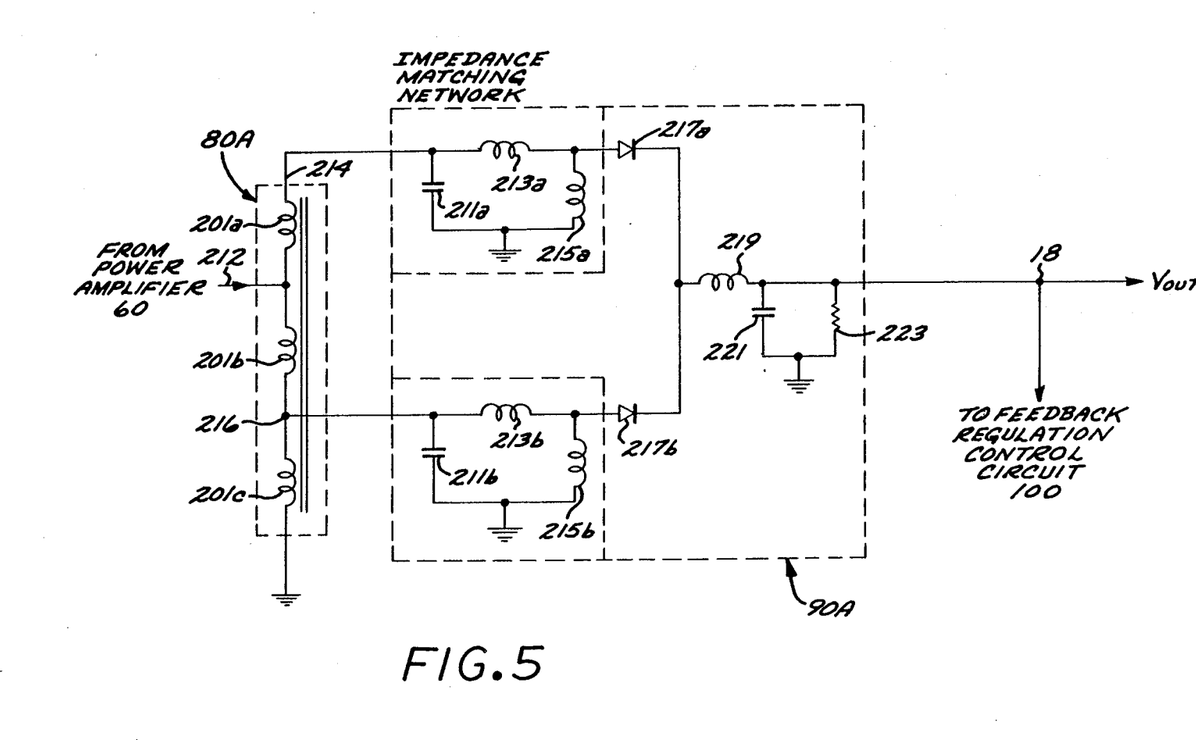
FIG. 5 is an illustrative example of an impedance transformation circuit and a rectifier/filter circuit which can be utilized in the power supply of FIG. 1.

Referring now to FIG. 5, shown therein are an impedance transformation circuit 80A and a rectifier/filter circuit 90A which can be utilized with the power amplifier 60A of FIG. 3. By way of specific example, the impedance transformation circuit 80A comprises a standard coaxial line balun transformer 201 having three serially connected windings 201a, 201b, 201c connected between a node 214 and ground. The node 212 between the windings 201a, 201b is connected to the output node 82 of the power amplifier 60A (FIG. 3). The node 214 at one end of the winding 201a is connected to one side of the rectifier/filter circuit 90A, and the node 216 between the windings 201b, 201c is connected to the other side of the rectifier/filter circuit 90A. The other end of the winding 201c is connected to ground.

The balun 201 functions to convert the output of the power amplifier 60A into two complementary signals (i.e., 180 degrees out of phase relative to each other), and can function to provide a step-up or step-down in voltage. If the power amplifier 60A provided complementary output signals, the balun 201 would not be necessary.

The rectifier/filter circuit 90 includes a first impedance matching network comprising a shunt capacitor 211a and a series inductor 213a. Specifically, the capacitor 211a is connected between the node 214 and ground, and the inductor 213 is connected between the node 214 and the anode of the diode 217a. A shunt inductor 215a is connected between the anode of the diode 217a and ground.

The rectifier/filter circuit 90 further includes a second impedance matching network comprising a capacitor 211b and an inductor 213b. Specifically, the capacitor 211b is connected between the node 216 and ground, and the inductor 213b is connected between the node 216 and the anode of the diode 217b. A shunt inductor 215b is connected between the anode of the diode 217b and ground.

The impedance matching networks function to match the output impedance of the balun to the input impedance of the rectifier diodes, and the shunt inductors 215a, 215b provide bias current to the diodes 217a, 217b.

The cathodes of the diodes 217a, 217b are connected together to an output filter network that comprises an inductor 219, a capacitor 221, and a resistor 223. The inductor 219 is connected between the cathodes of the diodes 217a, 217b and the output node 218 of the rectifier/filter 90A. The capacitor 221 and the resistor 223 are connected in parallel between the output node 218 and ground.

Figure 6:
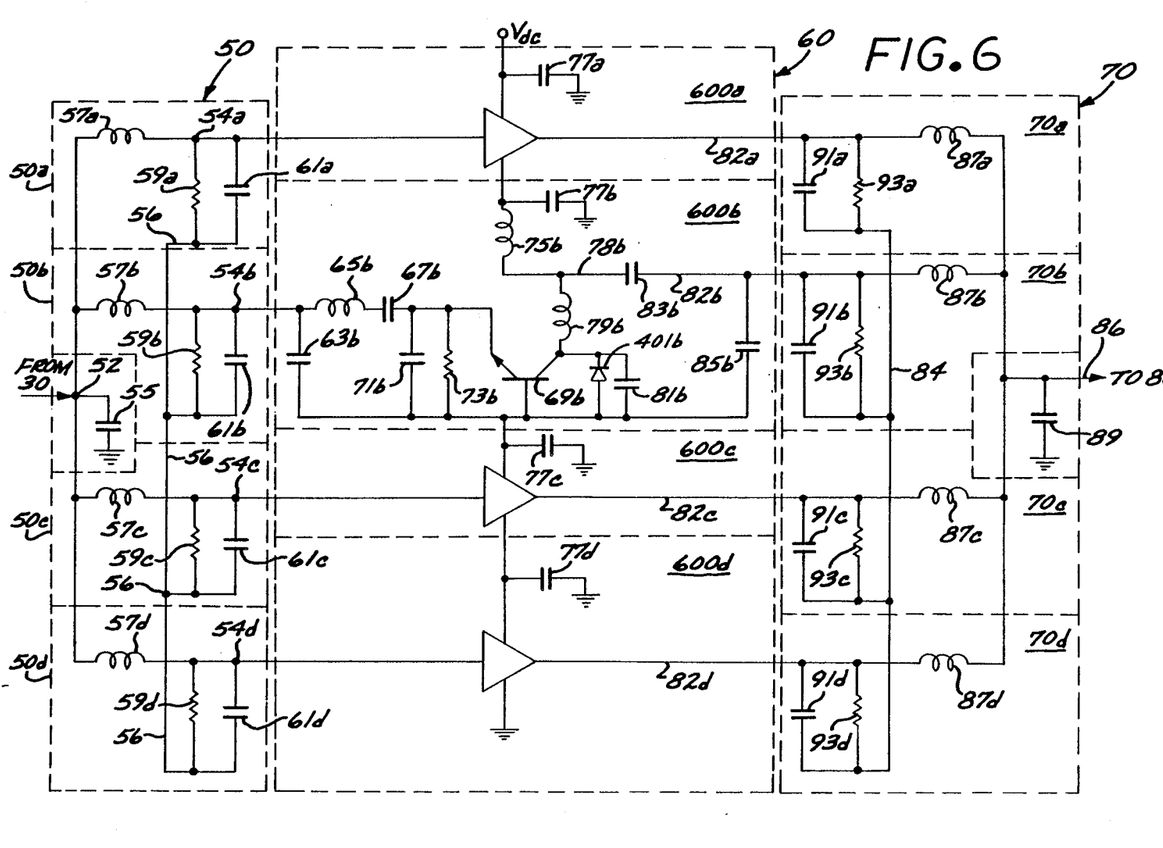
FIG. 6 is an illustrative example of a multiple stage power amplifier circuit which can utilized in the power supply of FIG. 1.

Referring now to FIG. 6, illustrated therein is a multiple stage power amplifier circuit 60B that can be utilized as the power amplifier circuit 60 of FIG. 1. The power amplifier circuit 60B generally includes a power splitter 50 that distributes the output of the preamplifier 30 substantially equally to a plurality of stacked power amplifiers 600. The power splitter 50 can be a Wilkinson type splitter, for example. The stacked power amplifiers 600 are shown by way of example as comprising 4 stacked power amplifiers 600a, 600b, 600c, 600d. Briefly, the stacked power amplifiers 600 effectively provide a serial DC bias path between the DC power source $V_{dc}$ and ground while providing parallel AC power outputs.

The outputs of the stacked power amplifiers 600 are combined in a power combiner 70, which by way of example can be Wilkinson type combiner, which provides its combined output to the impedance transformation circuit 80. By way of example, the impedance transformation circuit 80 and the rectifier/filter circuit 90 for use with the amplifier circuit 60B of FIG. 6 can be implemented as the impedance transformation circuit 80A and the rectifier circuit 90A of FIG. 5.

The splitter circuit 50 includes a capacitor 55 connected between the output node 52 of the preamplifier 30 (FIG. 2) and ground, and further includes four (4) identical subcircuits 50a, 50b, 50c, 50d connected between the preamplifier output node 52 and respective nodes 54a, 54b, 54c, 54d which are respectively connected to the inputs of the stacked amplifiers 600a, 600b, 600c, 600d. For ease of reference, only the circuit 50b will be described, but corresponding elements of all the subcircuits are identified in the figure with corresponding reference numerals together with respective alphabetic designators a, b, c, d.

The subcircuit 50b includes an inductor 57b connected between the node 52 and the node 54b, and further includes a resistor 59b and a capacitor 61b connected in parallel between the node 54b and a node 56 which is common to all subcircuits of the splitter circuit 50.

The power amplifiers 600a, 600b, 600c, substantially identical single transistor amplifiers which receive respective inputs on the nodes 54a, 54b, 54c, 54d. Except for specific biasing connections, each of the stacked amplifiers 600a, 600b, 600c, 600d is substantially identical to the amplifier 60A shown in FIG. 3. For ease of reference, the elements in the stacked amplifiers 600a, 600b, 600c, 600d that correspond to the elements in the amplifier 60A are identified with the same reference numerals followed by respective alphabetic designators a, b, c, d. Also for ease of reference, only the specific elements of the amplifier 600b are shown, but certain elements of the other amplifiers 600a, 600c, 600d will be referenced as required to fully explain the biasing connections.

The node between the inductor 75a and the capacitor 77a of the power amplifier 600a is connected to the power source $V_{dc}$. The node between the inductor 75b and the capacitor 77b of the power amplifier 600b is connected to the base of the transistor 69a of the power amplifier 600a. Similarly, the node between the inductor 75c and the capacitor 77c of the power amplifier 600d is connected to the base of the transistor 69b of the power amplifier 600b; and the node between the inductor 75d and the capacitor 77d of the power amplifier 600d is connected to the base of the transistor 69c of the power amplifier 600c. The base of the transistor 69d of the power amplifier 600d is connected to ground.

While the stacked amplifiers 600 of the power amplifier circuit 60B have been disclosed as common base amplifiers, it should be appreciated that each of the stacked amplifiers can comprise a common emitter amplifier as schematically shown in FIG. 5.

The combiner circuit 70 includes four (4) identical subcircuits 70a, 70b, 70c, 70d respectively connected between the amplifier output nodes 82a, 82b, 82c, 82d and a combiner circuit output node 86. For ease of reference, only the combiner subcircuit 70b will be described, with corresponding elements of all the subcircuits being identified in the figure with corresponding reference numerals together with respective alphabetic designators a, b, c, d.

The combiner subcircuit 70b includes a capacitor 91b and a resistor 93b connected in parallel between the power amplifier output node 82b and a node 84 that is common to all subcircuits of the combiner circuit 70. An inductor 87b is connected between the node 82b and the combiner output node 86, and a capacitor 89 is connected between the output node 86 and ground.

The output of the combiner circuit 70 is provided to an impedance transformation circuit 80 which can be implemented as the impedance transformation circuit 80A of FIG. 5. The rectifier/filter circuit 90 for use with the power amplifier 60B can be implemented as the rectifier/filter circuit 90A of FIG. 5.

While the foregoing stacked power amplifier circuit 60B has been discussed relative to the provision of a combined AC output, the AC outputs of the stacked amplifiers 600a, 600b, 600c, 600d can be provided to respective impedance transformation circuits and rectifier/filter circuits to provide respective DC outputs (i.e., without a combiner circuit 70). It should be noted, however, that as a result of series biasing, such configuration having parallel DC outputs requires that each power amplifier provide substantially the same output power, although the polarities and voltages of the respective DC outputs can be different.

The respective impedance transformation circuits and rectifier/filter circuits utilized with a power amplifier circuit that provides parallel AC outputs can be implemented with the transformation circuit 80A and the rectifier/filter circuit 90A of FIG. 5.

As a further configuration of the disclosed VHF power supply, separate preamplifiers could be provided for each of the stacked amplifiers 600a, 600b, 600c, 600d, wherein the splitter circuit 50 would not be utilized. The outputs of the stacked amplifiers 600a, 600b, 600c, 600d so configured could be combined to provide a single AC output or they could be transformed and rectified in parallel, as discussed above.

Figure 7:
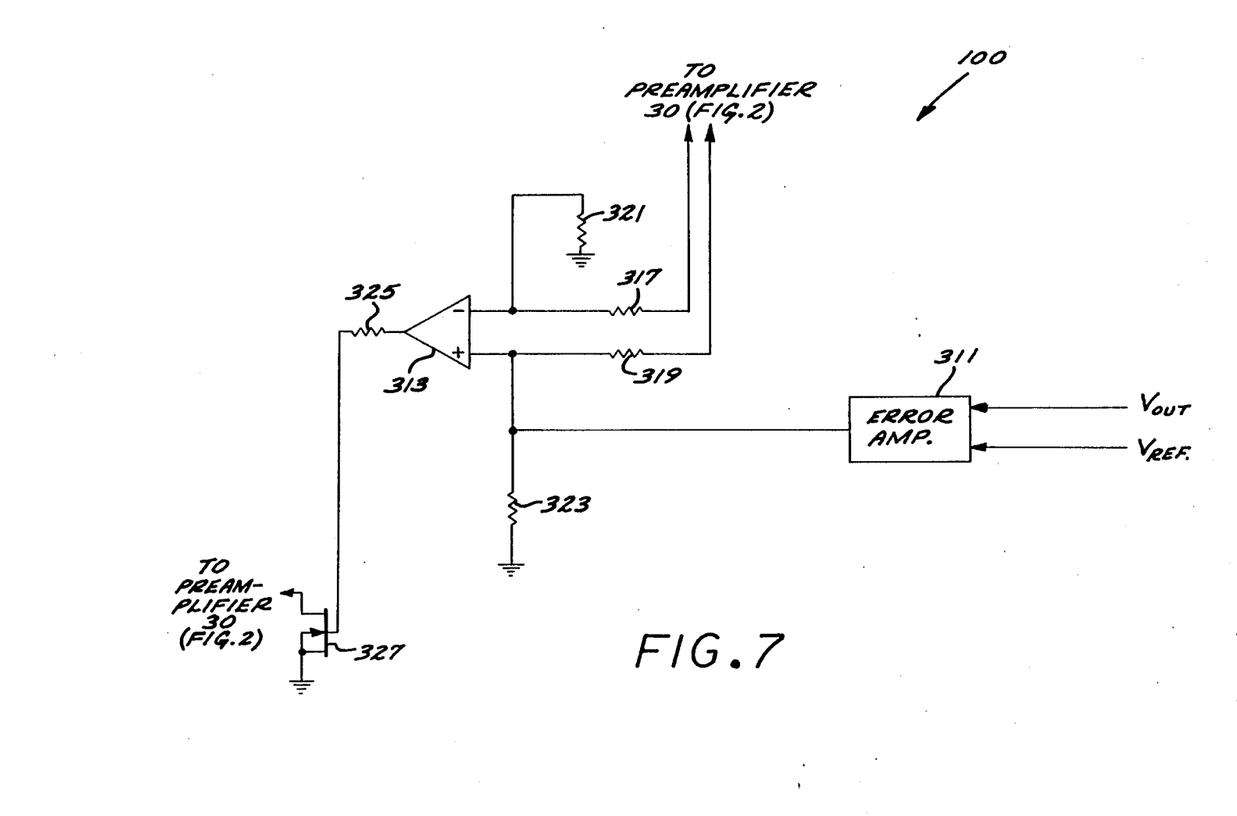
FIG. 7 is a block diagram of the feedback regulation control circuit of the power supply of FIG. 1.

Referring now to FIG. 7, schematically shown therein is an illustrative implementation of the feedback regulation control circuit 100 which includes an error amplifier 311 that is responsive to the power supply output voltage $V_{out}$ and a reference voltage $V_{ref}$, and provides an output indicative of the difference between the power supply output voltage $V_{out}$ and the reference voltage $V_{ref}$. The output of the error amplifier 311 is connected to the non-inverting input of an operational amplifier 313 which has its inverting and non-inverting inputs respectively coupled via respective resistors 317, 319 to the nodes 42, 44 on either side of the sampling resistor $R_s$ of the preamplifier 30 (FIG. 2). A resistor 321 is connected between the inverting input of the operational amplifier 313 and ground, while a resistor 323 is connected between the non-inverting input of the operational amplifier 313 and ground.

The output of the operational amplifier 313 is coupled via a resistor 325 to the gate of an FET 327 which has its source connected to ground. The drain of the FET 327 is connected to the inductor 43 of the preamplifier 30 (FIG. 2), and controls the DC current through the preamplifier.

In operation, the voltage across the sensing resistor $R_s$ is indicative of the DC collector current of the transistor 39 of the preamplifier 30 and thereby the DC current through the FET 327. The voltage across the sampling resistor, which is indicative of the FET DC current, produces a current that is summed with the output of the error amplifier 311 to produce a signal which linearizes the current gain of the FET 327. Essentially, an increase in the gate input to the FET 327 increases the DC collector current of the transistor 39, which in turn increases the RF output drive signal provided by the preamplifier 30.

As a result of the very high frequencies utilized in sections of the disclosed VHF power supply, implementation thereof involves layout considerations, which are slightly different for different portions of the power supply circuit.

The oscillator 20, the preamplifier 30, and the power amplifier circuit 60 should be laid out pursuant to generally accepted RF layout techniques that minimize or reduce resistive losses, coupling effects, and parasitic effects. Thus, for example, resistive ($I^2R$) losses due to circulating currents are reduced by keeping the ground paths between components as short as practicable, and also by keeping the ground points as close to a single point as practicable. A ground plane which has a lower impedance than thin, long conductive traces can be utilized to reduce resistive losses. Resistive losses in capacitive and inductive components can be reduced by utilizing components having large unloaded Q's (i.e., with minimum resistive impedances).

Further as to layout of the oscillator 20, preamplifier 30, and power amplifier circuit 60, parasitic coupling between components is reduced or avoided by appropriate separation between components, including appropriate separation between input and output networks, for example. The consideration of separation results in a tradeoff relative to reducing circulating currents by locating ground points close together. The resonance effects and signal phase mismatch due to component lead length are reduced by making component leads as short as practicable, which presents a tradeoff consideration relative to component separation for avoiding parasitic coupling.

The rectifier/filter 90 should also be appropriately laid out to minimize losses due to circulating current losses (i.e., ground paths should be made as short as practicable and ground points should be made as close together as practicable). Component lead length should be short to minimize resonance and radiation effects, but component location and separation between the input matching networks, the diodes, and the output filter may be less critical since the signal through the filter is DC. It is important, however, that the rectifier circuit input and the amplifier circuit output be located close to each other since any length of conductor between the amplifier output and the rectifier input introduces phase mismatch.

The feedback control circuit includes operational amplifiers, and generally accepted operational amplifier layout practices should be utilized to reduce stray capacitances and insure proper grounding. The conductive path from the feedback control circuit to the preamplifier should be short to prevent inductive ringing or noise pick-up.

The disclosed VHF DC to DC power supply can be advantageously implemented with printed microstrip or stripline passive components, which provides for reduced manufacturing cost. While the power supply has been implemented at an operating frequency of 100 MHz with printed passive components on low dielectric substrate material, further size reduction can be achieved by reducing the propagation velocity in the substrate, for example by utilizing a substrate of higher dielectric constant (i.e., higher permittivity) and/or higher permeability. The size reduction at 100 MHz due to substrate material having reduced propagation velocity makes printed passive components practical at lower frequencies.

The foregoing has been a disclosure of a very high frequency DC to DC power supply that advantageously operates at frequencies greater than 50 MHz and provides advantages including increased efficiency, increased power density (i.e., more power per packaged unit volume), reduced component sizes, the capability to utilize microstrip or stripline passive elements, simplified output filtering, and lower cost. Further, the disclosed power supply provides for fast response which reduces or eliminates the requirement for large energy storage elements such as capacitors. As a result, the volume of the power supply components is reduced, and the reliability of the power supply is improved due to the reduction of stored energy in storage elements such as capacitors.

The stacked amplifier implementation provides additional advantages including the ability to use VHF transistors which individually would not meet the DC input voltage requirements. The AC parallel and DC series configuration of power amplifier stages allows each stage to operate at a higher impedance level, which simplifies realization of the passive components, and also allows for lower power levels in each stage, which contributes to the efficiency of the power supply.

While the foregoing VHF power supply operates at frequencies that are considered RF, the considerations involved in the VHF power supply are different from those for common RF amplifiers. With common RF amplifiers, optimum efficiency is typically compromised for ruggedness, stability, bandwidth, gain, and low harmonic and intermodulation distortion. In contrast, the disclosed VHF power supply achieves optimum efficiency by high gain, low resistance loss, and very good impedance matching, while compromising bandwidth, ruggedness and stability margin with load variations. As to harmonic distortion, it can be tolerated at output of the power amplifier of the VHF power supply which can be filtered. However, harmonic distortion at the power amplifier transistor during its OFF state must be reduced since that causes power dissipation and reduced efficiency.

Although the foregoing has been a description and illustration of specific embodiments of the invention, various modifications and changes thereto can be made by persons skilled in the art without departing from the scope and spirit of the invention as defined by the following claims.

What is claimed is:

1. A DC to DC power supply comprising;
RF drive means for providing an RF output drive signal having a frequency greater than about 50 Mhz;
amplifier means responsive to said RF output drive signal and to a DC supply voltage for providing an AC amplified output;
means for impedance transforming said AC amplified output to provide an impedance transformed AC signal; and
means for rectifying said impedance transformed AC signal to provide a DC voltage output.

2. The DC to DC power supply of claim 1 wherein said amplifying means comprises a power amplifier tuned to the frequency of said RF drive means.

3. The DC to DC power supply of claim 2 wherein said power amplifier comprises a common base amplifier.

4. The DC to DC power supply of claim 2 wherein said common base amplifier includes a tuned input matching network and a tuned output matching network.

5. The DC to DC power supply of claim 2 wherein said power amplifier comprises a common emitter amplifier.

6. The DC to DC power supply of claim 5 wherein said common emitter amplifier includes a tuned input matching network and a tuned output matching network.

7. The DC to DC power supply of claim 1 wherein said impedance transforming means comprises a balun transformer.

8. The DC to DC power supply of claim 1 wherein said amplifying means comprises:
power splitting means responsive to said RF output drive signal for providing a plurality of RF drive signals; and
a plurality of power amplifiers respectively responsive to said RF drive signals for providing a plurality of amplified AC out signals.

9. The DC to DC power supply of claim 6 wherein said impedance transformation means comprises a plurality of impedance transformation circuits respectfully responsive to said plurality of amplified AC output signals.

10. The DC to DC power supply of claim 6 wherein said amplifying means further includes power combining means for combining said amplified AC output signals to provide a combined AC output signal.

11. The DC to DC power supply of claim 6 wherein said plurality of amplifiers comprise a plurality of stacked amplifiers which are DC biased in series.

12. The DC to DC power supply of claim 9 wherein each of said plurality of amplifiers comprises a common base amplifier.

13. The DC to DC power supply of claim 12 wherein said common base amplifier includes a tuned input matching network and a tuned output matching network.

14. The DC to DC power supply of claim 9 wherein each of said plurality of amplifiers comprises a common emitter amplifier.

15. The DC to DC power supply of claim 14 wherein said common emitter amplifier includes a tuned input matching network and a tuned output matching network.

16. The DC to DC power supply of claim 1 further including feedback regulation control means responsive to said DC voltage output and a reference voltage for controlling said RF drive means.

17. The DC to DC power supply of claim 16 wherein said RF drive means includes a bipolar transistor amplifier and wherein said feedback regulation control means controls the current provided by the emitter of said transistor amplifier.

18. The DC to DC power supply of claim 17 wherein said feedback regulation control means includes an FET coupled to the emitter said transistor amplifier and means for linearizing the current gain of said FET.

19. A DC to DC power supply comprising;
RF drive means for providing an RF output drive signal having a frequency greater than 50 Mhz;
amplifier means responsive to said RF output drive signal and to a DC supply voltage for providing an AC amplified output;
means for impedance transforming said AC amplified output to provide an impedance transformed AC signal;
means for rectifying said impedance transformed AC signal to provide a DC voltage output; and
feedback regulation control means responsive to said DC voltage output and a reference voltage for controlling said RF drive means.

20. The DC to DC power supply of claim 19 wherein said RF drive means includes a bipolar transistor amplifier and wherein said feedback regulation control means controls the current provided by the emitter of said transistor amplifier.

21. The DC to DC power supply of claim 20 wherein said feedback regulation control means includes an FET coupled to the emitter said transistor amplifier and means for linearizing the current gain of said FET.

* * * * *